Nov. 27, 1923.
E. B. CUSHMAN
1,475,223
AUXILIARY POWER CARRIER FOR VEHICLES
Filed April 14, 1919    2 Sheets-Sheet 1
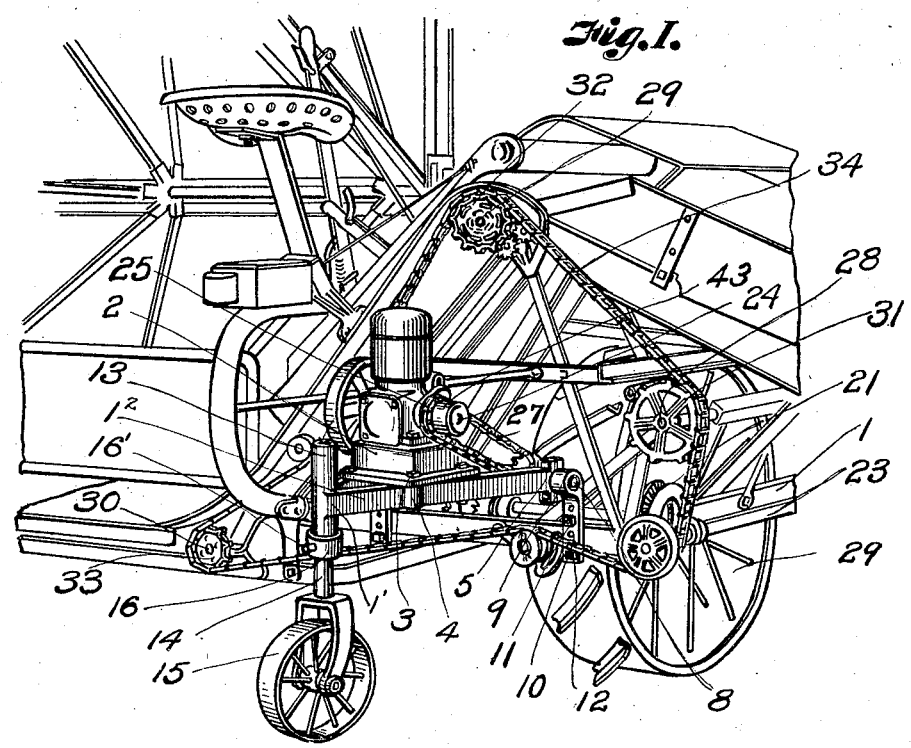
Fig. I.
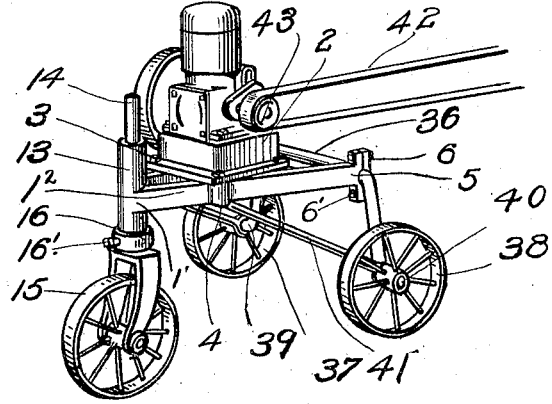
Fig. II.
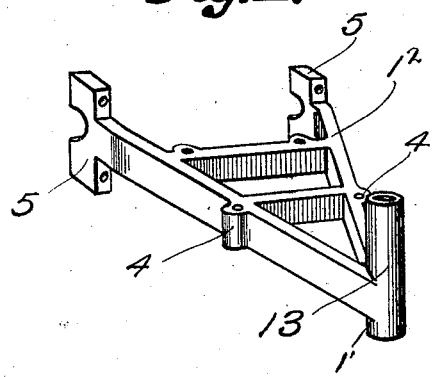
Fig. III.
INVENTOR
Everett B. Cushman.
BY
ATTORNEY

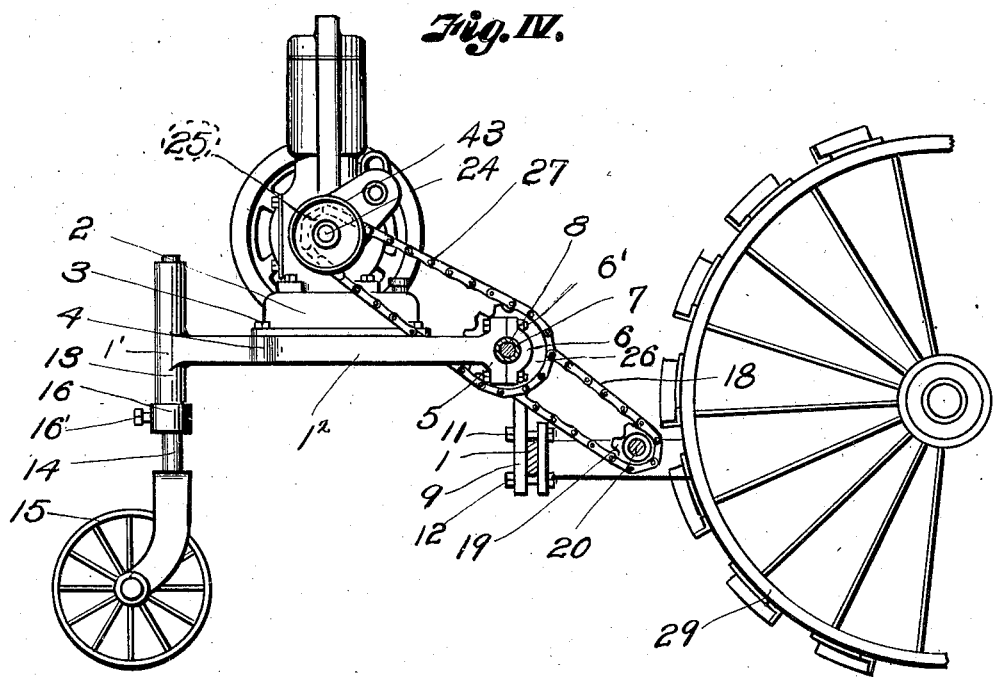
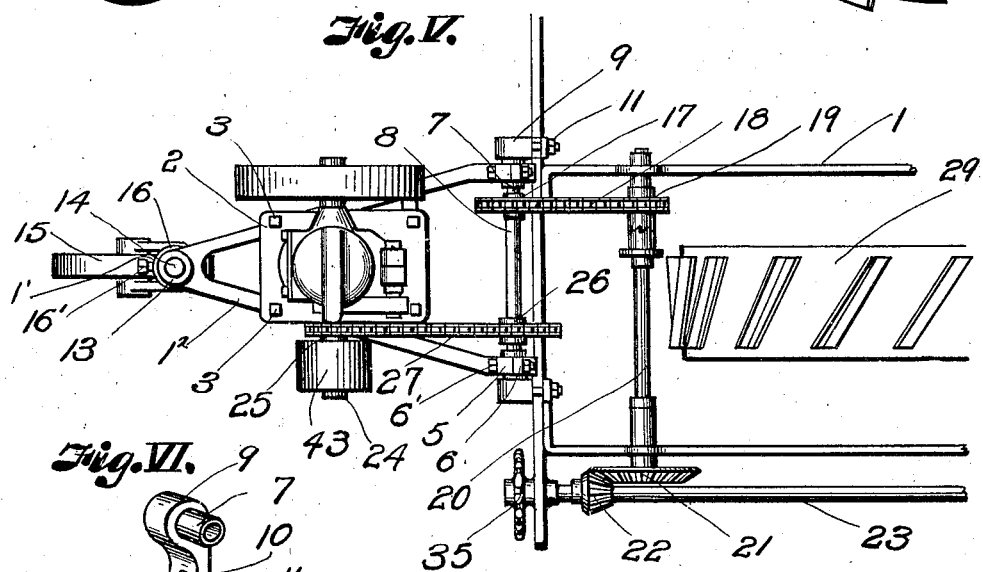
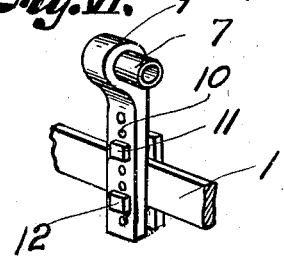

Patented Nov. 27, 1923.

1,475,223

UNITED STATES PATENT OFFICE.

EVERETT B. CUSHMAN, OF TOPEKA, KANSAS, ASSIGNOR, BY MESNE ASSIGNMENTS, TO O. D. COLLIS, OF CLINTON, IOWA.

AUXILIARY POWER CARRIER FOR VEHICLES.

Application filed April 14, 1919. Serial No. 289,854.

*To all whom it may concern:*

Be it known that I, EVERETT B. CUSHMAN, a citizen of the United States, residing at Topeka, in the county of Shawnee and State of Kansas, have invented certain new and useful Improvements in Auxiliary Power Carriers for Vehicles; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to power units and more particularly to a power unit for driving the operating mechanism of a grain harvester, other machine or vehicle independently of travel of the machine or vehicle to which the unit is applied, one of the principal objects of the invention being the connection of such a power unit with a grain harvester, other machine or vehicle so that the vibrations of one will not affect the other. For example, the continuously successful operative performance of the gas engine is, to no small extent, enhanced by a minimum of vibration, while grain harvesters are so constructed that there is considerable vibration throughout the frame, due in part to the delicacy of the frame work to minimize weight, augmented by the peculiar characteristics of the operating mechanism carried by the frame. According to my invention, the driving unit, for example, a gas engine, may be supported upon a carrier or portable base, auxiliary to but movable with the harvester, so that relatively little vibration is transmitted to the engine from the harvester as the vehicles travel over the ground with the engine connected up to the operating mechanism of the harvester so that power may be communicated thereto in an efficient manner.

I have also provided means whereby the power unit may be temporarily detached from connection with the harvester so that it will be adapted to be used for communicating power to other units.

In actual practice I have found it is preferable in most instances, to trail the auxiliary carrier supporting the engine and to couple the trailing carrier to the harvester or other frame by a transmission shaft and its bearings, thereby simplifying the construction, the coupling therefore constituting one of the features of the invention.

The auxiliary carrier, when attached to the harvester, may be provided with a single caster wheel to facilitate the turning of the carrier with the main machine or harvester, and the coupling may consist of a removable connection between the main frame and the carrier so that the carrier may be removed and supported upon an independent axle to form a power unit for general farm use and to effect easy transportation from place to place, independent of the harvester or other implement to which it is ordinarily attached.

In accomplishing the several objects of my invention I have provided improved details of construction, the preferred form of which is illustrated in the accompanying drawings, wherein, Fig. I is a perspective view of the portable power unit and carrier, illustrating its connection with a harvester.

Fig. II is a perspective view of the power unit detached.

Fig. III is a detail view of the preferred form of carrier frame.

Fig. IV is a side elevational view of the power unit and part of the driven mechanism.

Fig. V is a top plan view of the same, and

Fig. VI is a detail view of an adjustable coupling member between the support for the driving element and part of the frame for the driven element.

Referring now to the drawings by numerals of reference:

1 designates the main frame of the implement such as a harvester or the like, and 1' the auxiliary carrier or frame for the engine 2, here shown to be of the ordinary vertical type having a base mounted upon the carrier 1' by bolts 3 passing through the base and through the bosses 4 on the carrier frame.

The auxiliary carrier is preferably of skeleton construction comprising diverging side rails 1², having bearings comprising main bearing parts 5 at their split ends including caps 6 secured to the main bearing part by bolts 6' to permit removable application of the bearings to the tubular drags or coupling members 7, carried by the vertically adjustable brackets 9 on the main frame, the bearings being free to turn on the drag members so that the frame 1' may have automatic adjustment to conform to uneven ground and the drag members being adjustable in the main frame to adapt the carrier to frames of different heights. The tubular drags or coupling members comprise bearings for a transmission shaft 8 which is connected with the engine on the carrier and with the operating mechanism on the harvester.

In Figure VI I have shown the brackets 9 as comprising front and back plates adapted to lie against opposite faces of a cross bar of the main frame and provided with a plurality of openings 10 to receive the bolts 11 and 12 whereby the plates may be attached to the cross bar in adjusted positions. At the apex of the frame I have shown a tubular bearing 13 to receive the pintle or shaft 14 of a caster wheel 15 adapted for vertical adjustment by means of the collar 16 and set screw 16' whereby the auxiliary frame may be raised and lowered to conform to the height of the main frame and maintain its longitudinal plane when the carrier is first applied to the main frame and when the height of the main frame is adjusted to conform to the height of grain in which the machine is working. The shaft 8 is connected with the operating mechanism of the harvester, preferably by a chain running over a sprocket wheel 17 on the coupling shaft and over a sprocket wheel 19 on the drive shaft 20 of the harvester or other implement, the shaft 20 being provided with a beveled gear 21 which meshes with a pinion 22 on the counter-shaft 23 from which power is usually communicated to the several parts of the harvester.

Any suitable means may be employed for communicating motion from the engine to the shaft 8 but I have here shown the engine shaft 24 as provided with a sprocket 25 in line with a sprocket wheel 26 on shaft 8, the sprocket wheels 25 and 26 being connected by a chain 27. The sprocket wheels 17 and 26 may be moved longitudinally on the shaft to permit removal of the shaft from its bearings, but normally serve to retain the shaft in place.

The main implement selected for the purpose of illustration is shown as a harvester provided with a tying mechanism shaft 28, an elevator driving shaft 29 and a lateral conveyor shaft 30, these being provided with sprockets 31, 32 and 33 respectively and having motion communicated thereto by the endless sprocket chain 34, which receives its motion from the sprocket wheel 35 on the counter-shaft 23.

It will be assumed that the harvester is to be conducted through a field by horse or other power and trails the carrier upon which the engine is mounted. With the carrier connected with the main frame by the coupling described, the engine, when in operation, transmits power through the coupling to the harvester parts so that such parts are driven to perform their functions but do not necessitate an additional load on the motive power that would be induced were the harvester parts driven from the ground wheels.

It is apparent that by removably connecting the auxiliary carrier with the implement, a single frame and engine may be used with a number of different implements and that when the engine is not required for use with any implement, the carrier may be disconnected and supplied with the auxiliary axle 36 and ground wheels 37 and 38, whereby the engine may be conducted from place to place for general use, such as wood sawing, silo filling, etc. The auxiliary support is preferably of the form shown, constituting the arched axle 36 connected with the frame through the bearings 5 and 6 and having end spindles 39 and 40 on which the ground wheels are supported, the axle being braced by the rod 41.

When the engine is to be employed for general use a belt 42 may be run over a pulley 43 on the engine shaft to transmit power as desired.

Thus it will be seen that the power unit may be conveniently attached to and detached from any known type of agricultural implement or other main frame on which driven elements are to receive power and that the device may be expeditiously removed to serve as a power unit for other purposes.

What I claim and desire to secure by Letters-Patent is:

1. In combination, a vehicle comprising operating mechanism and having combination bearing and coupling members for a transmission shaft and an auxiliary carrier, a transmission shaft rotatable in said bearing member, a carrier connected with said couplings, an engine mounted on the carrier, and means connecting the transmission shaft with the operating mechanism and with the engine.

2. In combination, a vehicle comprising operating mechanism and having combination coupling and bearing members rigidly supported thereon for vertical adjustment relative thereto, a shaft journaled in said bearings, an engine carrier connected to said bearings, an engine mounted on the carrier, means directly connecting the shaft with the operating mechanism and means connecting the shaft with the engine.

3. In combination, a vehicle frame, a pair of spaced brackets carried thereby, bearing sleeves in said brackets, a shaft journaled in said bearing sleeves, an engine carrier comprising a rigid frame, and means connecting said frame at spaced points to said bearing sleeves.

4. In combination, a vehicle frame, a pair of brackets vertically adjustable on the frame, a shaft journaled on said brackets, an engine carrier connected to said frame through said shaft, and a caster wheel adjustably supporting the rear end of said engine carrier.

5. In combination, a vehicle, brackets on the vehicle, coupling members on the brackets having interior bearings, a shaft journaled in said bearings, a carrier having pivotal mounting on the coupling members, an engine on the carrier, means connecting the shaft with the engine, and operating mechanism on the vehicle connected with said shaft.

6. In combination with a vehicle, operating mechanism carried thereby, brackets on the vehicle comprising aligning coupling members having interior bearings, a shaft removably and rotatably mounted in the interior bearings, a carrier having bearings pivotally mounted on the coupling members of the bracket, an engine on said carrier, and means connecting said shaft with the engine and with said operating mechanism.

7. In combination, a vehicle, comprising brackets and horizontal bearings, a carrier comprising a frame having horizontal bearings at its free ends engaged by the horizontal bearings on the vehicle, and a vertical bearing at the opposite end, a shaft removably mounted in the horizontal bearings coupling the carrier to the vehicle, and a caster wheel having a standard mounted in said vertical bearing.

8. In combination, a harvester, vertically adjustable spaced brackets carried by said harvester, an engine support coupled to said brackets, and an adjustable caster wheel supporting the free end of said carrier.

In testimony whereof I affix my signature.

EVERETT B. CUSHMAN.